Figure 1:
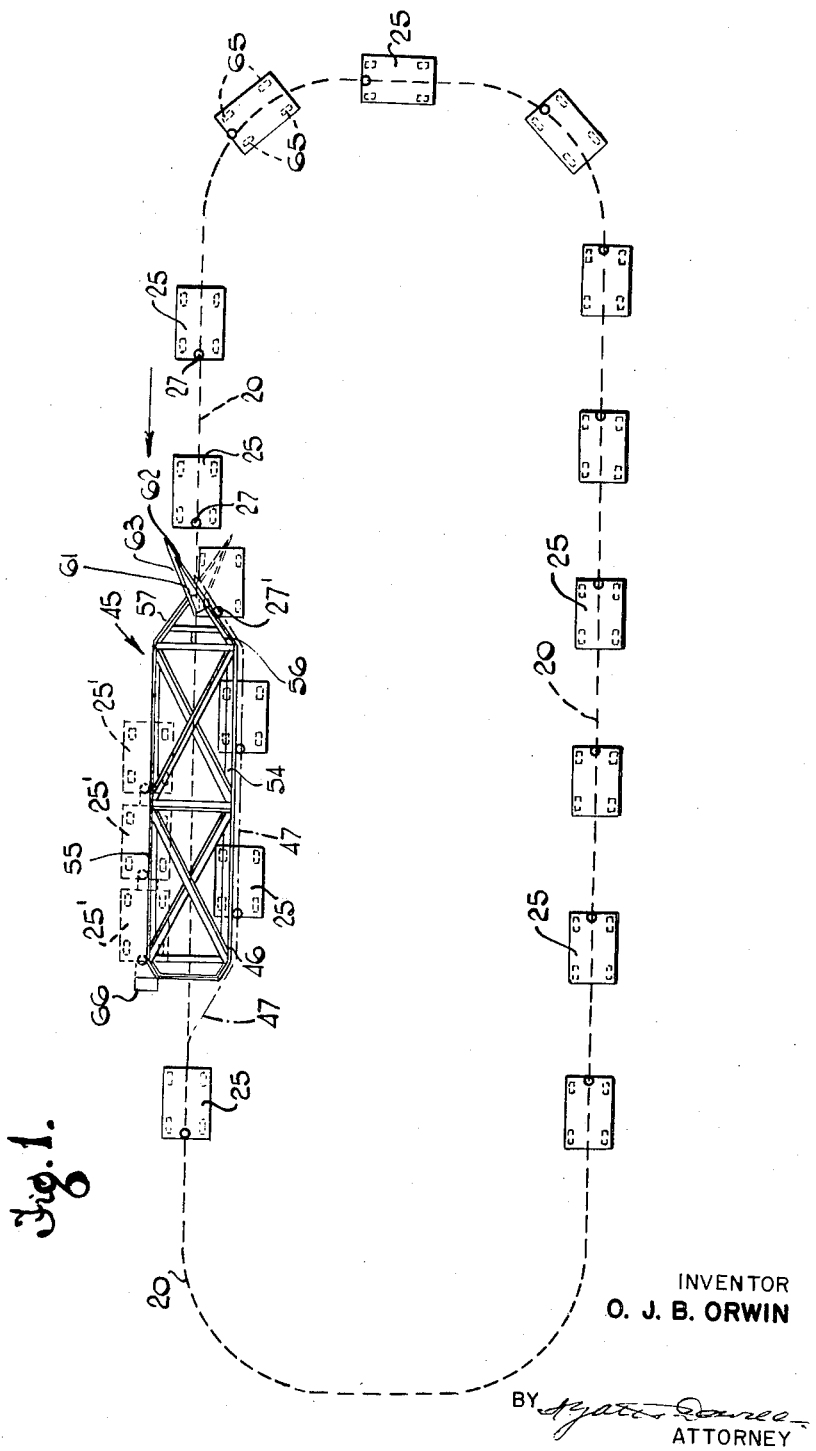

Nov. 27, 1962   O. J. B. ORWIN   3,065,714
CONVEYOR SYSTEMS
Filed Aug. 31, 1961   9 Sheets-Sheet 1

INVENTOR
O. J. B. ORWIN

BY
ATTORNEY

Nov. 27, 1962 — O. J. B. ORWIN — 3,065,714
CONVEYOR SYSTEMS
Filed Aug. 31, 1961 — 9 Sheets-Sheet 2

INVENTOR
O. J. B. ORWIN
BY
ATTORNEY

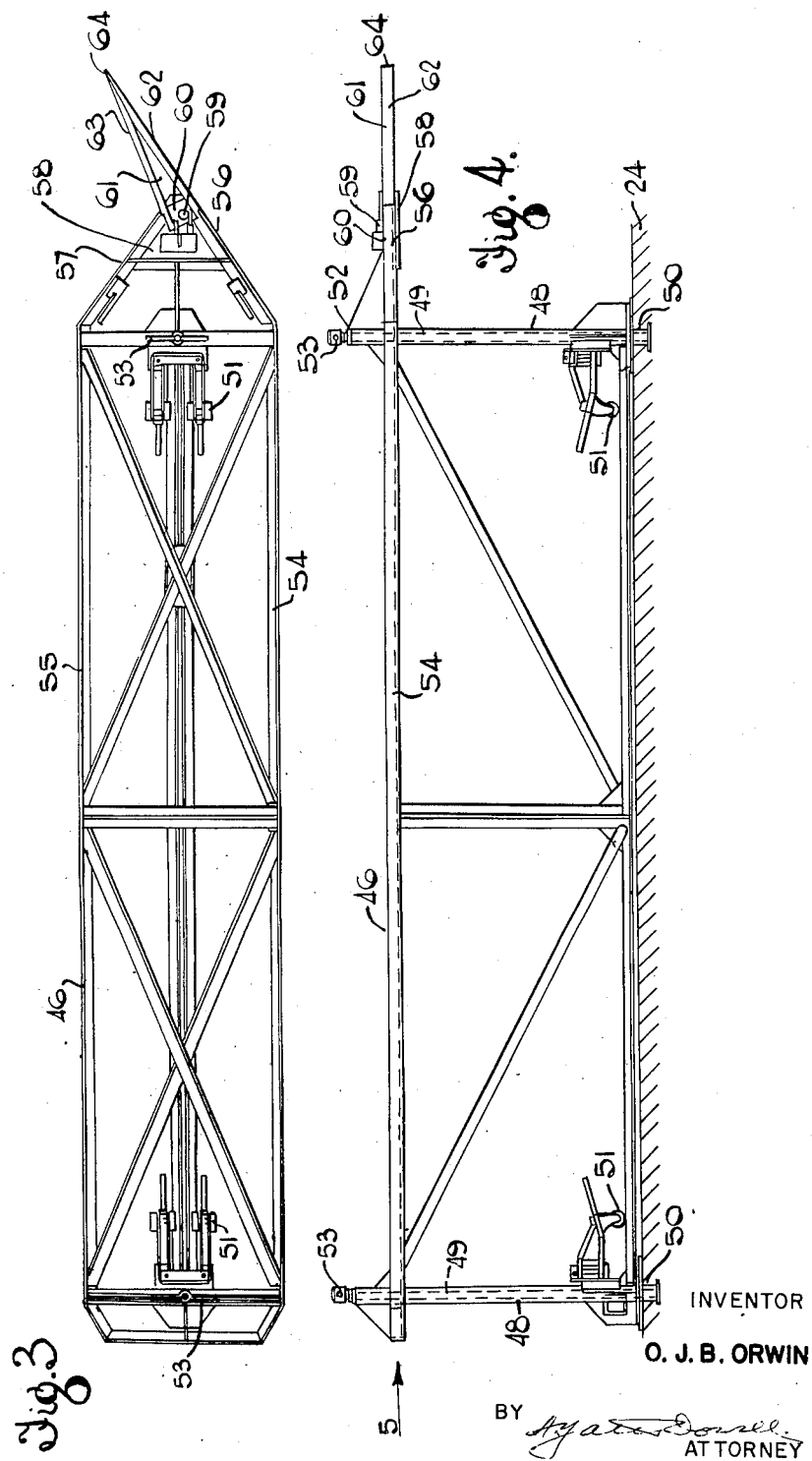

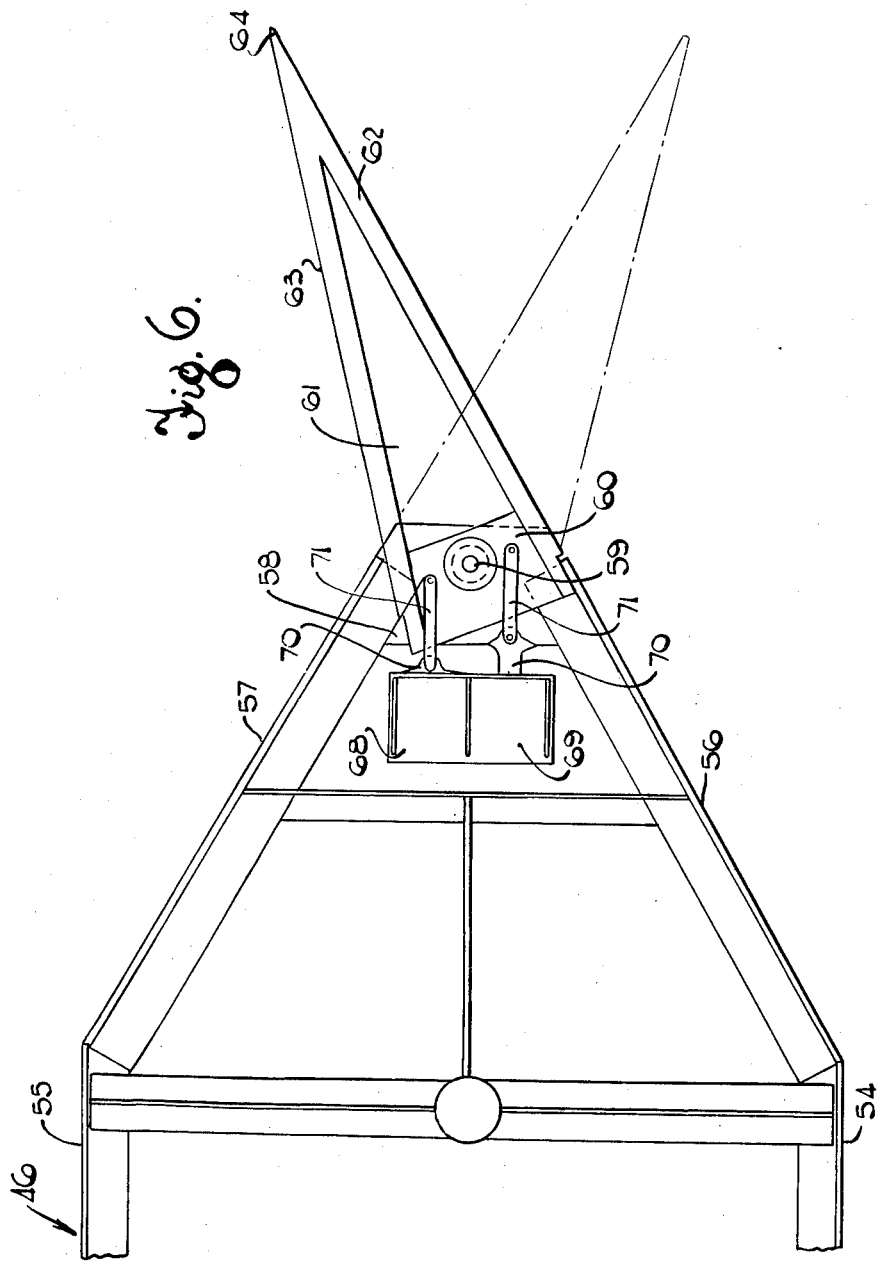

Nov. 27, 1962　　　O. J. B. ORWIN　　　3,065,714
CONVEYOR SYSTEMS
Filed Aug. 31, 1961　　　　　　　　　　　9 Sheets-Sheet 6
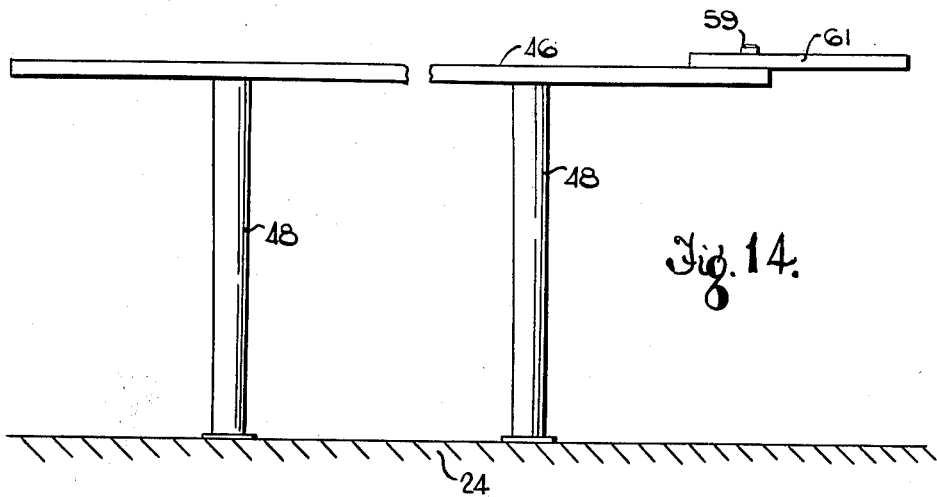
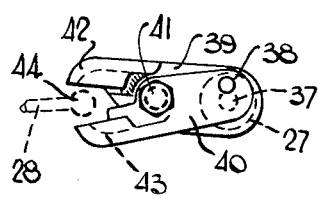
INVENTOR
OLAF JOHN BARCLEY ORWIN
BY
ATTORNEY

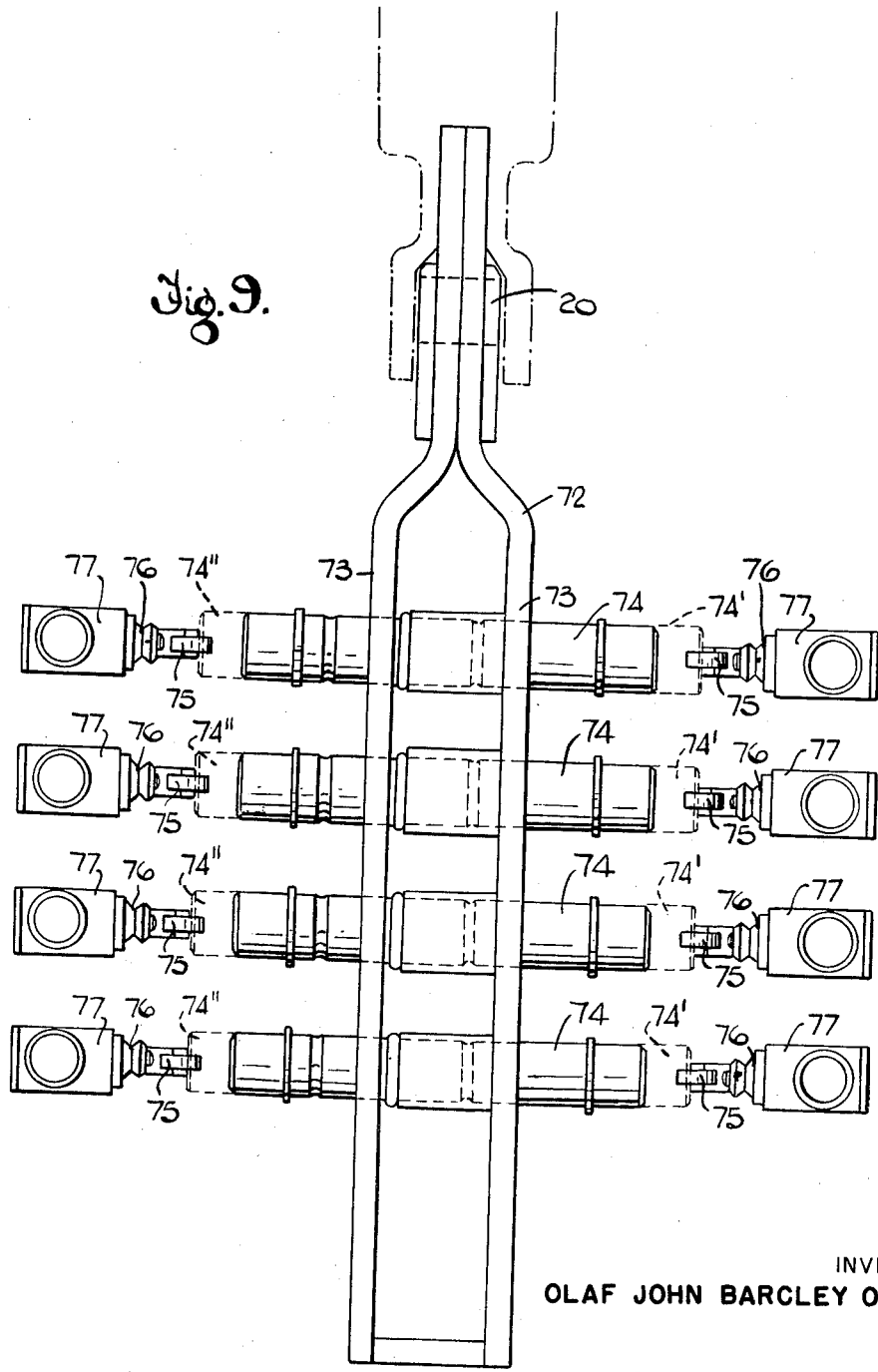

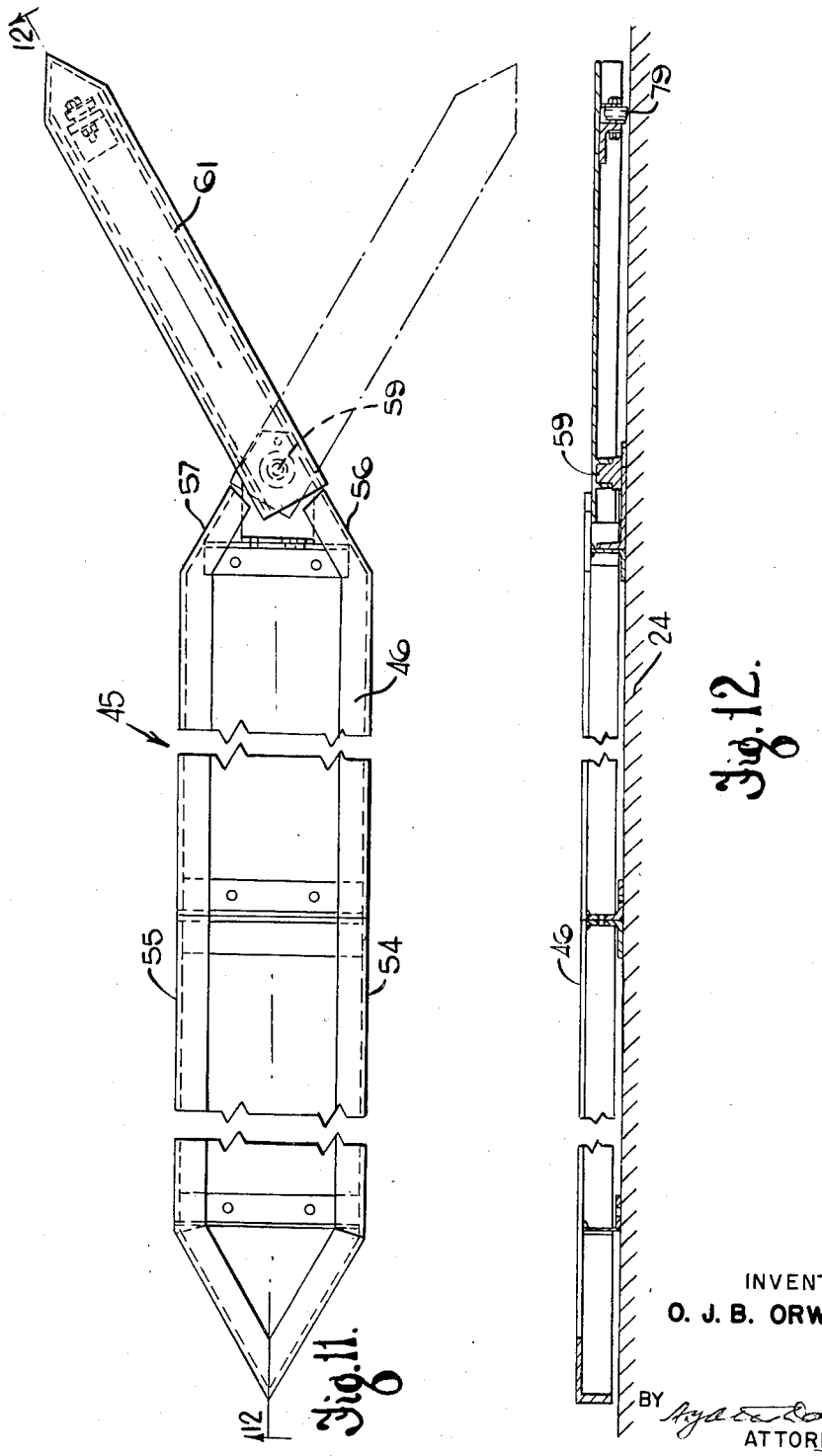

Nov. 27, 1962   O. J. B. ORWIN   3,065,714
CONVEYOR SYSTEMS
Filed Aug. 31, 1961   9 Sheets-Sheet 9

INVENTOR
O. J. B. ORWIN
BY
ATTORNEY

United States Patent Office 3,065,714
Patented Nov. 27, 1962

3,065,714
CONVEYOR SYSTEMS
Olaf John Barclay Orwin, Quinton, Birmingham, England, assignor to Fisher & Ludlow Limited, Tipton, England, a British company
Filed Aug. 31, 1961, Ser. No. 136,152
16 Claims. (Cl. 104—88)

This invention relates to conveyor systems and is concerned with that kind of conveyor system which comprises a conveying element such as an endless conveyor chain supported above a floor in substantially parallel relation thereto, a plurality of wheeled trucks adapted to be advanced over the floor, and drive transmitting means operating between the conveying element and each truck and adapted to transmit drive thereto from the conveying element to advance the trucks along a predetermined path across the floor, the arrangement being such that the drive between the conveying element and any one of the trucks can be disconnected to permit of such truck being brought to rest without stopping the continued advancement of the conveying element and the other truck or trucks driven therefrom.

In any conveyor system of the foregoing kind the trucks are advanced along a path which is predetermined by the location of the conveying element and if a particular truck, by disconnection of the drive thereto, is brought to rest at a predetermined position in the truck path it is necessarily liable to obstruct the continued advancement of following trucks unless specially diverted manually out of the path by an operator.

The present invention has for its object the provision of an improved arrangement by which a truck which is required to be brought to rest can be diverted out of the path of following trucks, without manual intervention by the operator.

According to the present invention, the conveyor system is provided with a truck diverting device, comprising one or more fender elements, means for mounting each fender element in a predetermined location in relation to the floor, each fender element having operatively associated therewith means for diverting to one side of said element and to one side of said path of advancement of the trucks any one or more of a succession of advancing trucks and means for disconnecting the drive to each of the so diverted trucks to bring the same to rest at a position to one side of said truck path clear of those trucks which continue to advance successively therealong.

The means for diverting one or more trucks to one side of said fender element may be constituted by an integral part of said element of wedge or tapered configuration which extends from one end of said element in a rearward direction, i.e. opposite to the designed direction of truck advancement, and the element itself including the tapered portion thereof may be mounted for limited angular movement about a vertical axis relative to the floor so as thereby to permit of said displacing means constituted by said tapered portion being displaced between two positions, one of which constitutes a diverting device and the other of which constitutes a truck advancing position, in which position the trucks are permitted to advance along the said predetermined truck path clear of the path of advancement of the diverted trucks.

Preferably, however, the diverting means would be constructed as a tongue or switch mounted for pivotal movement relative to the fender element so as to be displaceable relative to the fender element between the two positions referred to.

Such tongue or switch may be supported for pivotal movement from the floor independently of the fender element, but preferably it would be mounted thereon.

Whatever arrangement is adopted, the fender element itself serves to maintain the so diverted trucks in a path which is to one side of i.e. diverted from the predetermined path of truck advancement aforementioned, so as to ensure that the diverted trucks when brought to rest, are not in a position at which they might foul other trucks which are continuing to advance.

Preferably, the fender element with its associated diverting means would be adapted for removable mounting on the floor, such an arrangement permitting if desired, of the element being removed completely after the diversion of a particular truck or a desired number of trucks has been effected as well as permitting of the element being disposed at different positions on the floor along the truck path, so as to effect diversion of one or more trucks at different locations on the floor as may be required.

The drive to the diverted trucks which are required to be arrested may be disconnected in any convenient manner, but preferably such drive disconnecting means would comprise the provision on the forward end of each truck of a displaceable buffer connected to a disengageable coupling provided on the truck and through which the drive is transmitted from the conveying element supported above the floor, the buffer being displaceable between a projected truck driving position and a retracted position in which the coupling is disengaged to disconnect the truck drive; and in such an arrangement the first of a number of diverted trucks would be arrested by a displaceable or retractable stop disposed on the floor at the end of the diversion path, so as thereby to arrest the first of the diverted trucks, and the buffers of the following diverted trucks would each be adapted to engage with the preceding already arrested truck so as thereby to be displaced and effect the appropriate drive disconnection.

Figure 2:
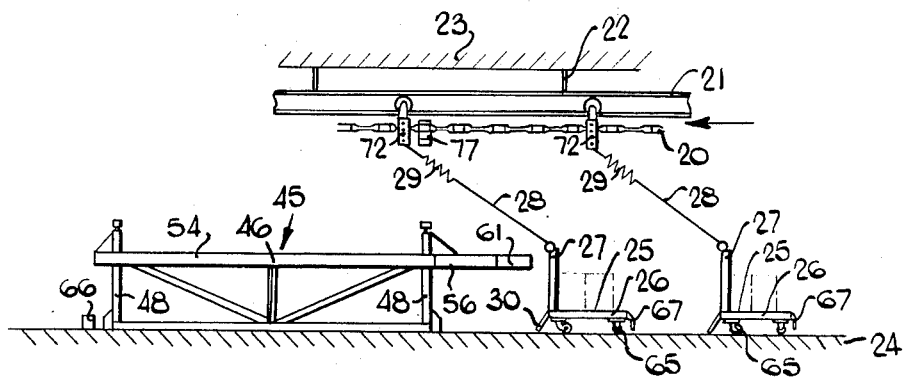
Figure 5:
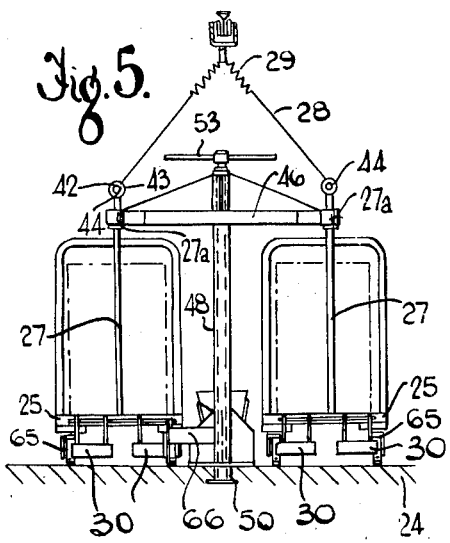
Figure 7:
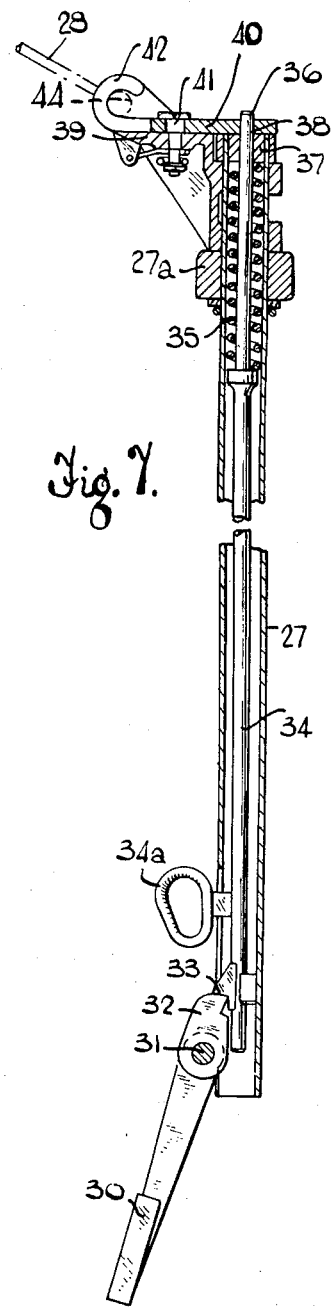
Figure 13:
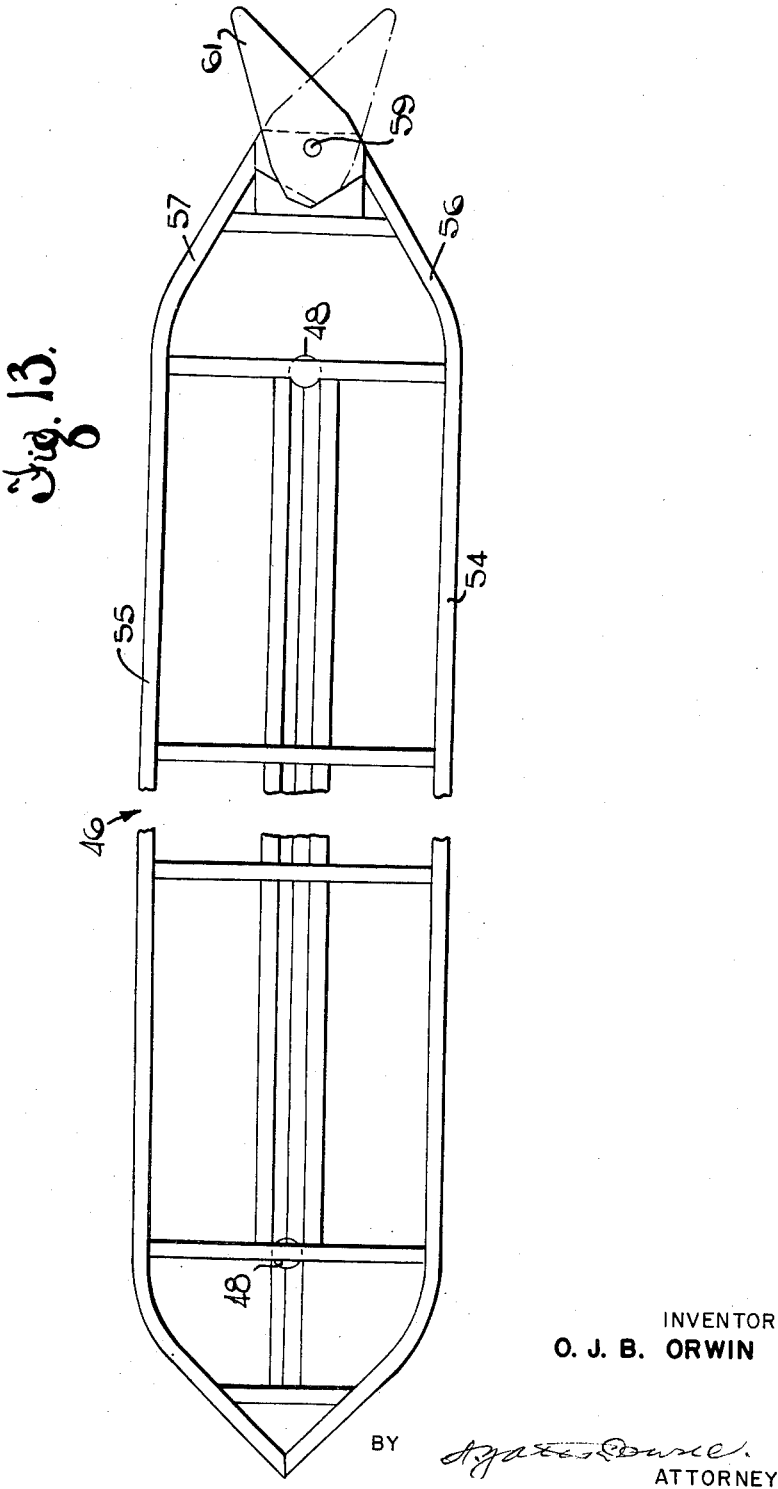

The invention is illustrated in the accompanying drawings, wherein:

FIGURE 1 is a diagrammatic plan view of one form of conveyor system of the foregoing kind and embodying the present invention, FIGURE 2 is a side elevation of part of the construction depicted in FIGURE 1, FIGURE 3 is a plan view to an enlarged scale of the fender element of the construction shown in FIGURE 1, FIGURE 4 is a side elevation of the fender element depicted in FIGURE 3, FIGURE 5 is an end view of the fender element shown in FIGURES 1 to 4, looking in the direction of arrow 5 in FIGURE 4, FIGURE 6 is a plan view to an enlarged scale of part of the fender element shown in FIGURES 3 and 4, FIGURE 7 is a cross sectional view to an enlarged scale illustrating the construction of the truck drive disconnecting means of the construction of FIGURES 1 and 2, FIGURE 8 is a plan view of the arrangement depicted in FIGURE 7, with the parts in the drive disconnected position, FIGURE 9 is a cross sectional view to an enlarged scale of part of the conveyor element of the construction depicted in FIGURES 1 and 2, illustrating an arrangement for automatically controlling the displacement of the diverting means of the construction depicted in FIGURES 3 to 5, FIGURE 10 is an electrical circuit diagram forming part of the same construction, FIGURE 11 is a plan view similar to FIGURE 3, showing a modified construction, FIGURE 12 is a cross sectional side view on the line 12—12 of FIGURE 11, FIGURE 13 is a plan view similar to FIGURE 3, showing a further construction, and FIGURE 14 is a side elevation of the construction depicted in FIGURE 13.

Referring firstly to the construction shown in FIGURE 1 to 10 of the drawings, the conveyor system there depicted comprises a conveying element in the form of an endless chain 20 which as shown is depicted diagrammatically in FIGURE 1. The chain is supported from a track 21 mounted through hangers 22 from a roof 23 or any other convenient support at a position above a floor 24, so that the chain 20 is supported in substantially parallel relation to the floor.

The conveyor system further comprises a plurality of wheeled trucks 25 adapted to be advanced over the floor and having a load carrying platform 26. Each truck 25 at its forward end in the designed direction of advancement is provided with an upstanding mast 27, to the upper end of which is secured the lower end of truck drive transmitting means in the form of a cable or other pulling member 28, which serves to transmit drive from the chain 20 to the associated truck to advance this over the floor.

As shown in FIGURES 7 and 8, each cable 28 is adapted to be disconnected from the upper end of the associated truck mast 27 so as to permit of the truck being brought to rest without stopping the continued advancement of the chain 20 and of the remaining trucks driven therefrom, and in each cable 28 is incorporated some form of spring loaded cable retracting means illustrated diagrammatically at 29 in FIGURE 2, so as to raise the cable when this has been disconnected from the truck mast. Such an arrangement of cable retracting means is already known in conveyor systems of the kind hereinbefore specified and need not, therefore, further be described.

Each truck 25 at its forward end is provided, as best shown in FIGURE 7, with a buffer 30, hinged at 31 about a horizontal transverse axis to the front end of the truck from which axis the buffer depends. The buffer, above such hinge axis, is provided with a cam 32 adapted to have releasable latching engagement with a nose 33 provided on the lower end of a rod 34, which is slidable vertically within the interior of truck mast 27 which is made of tubular form for this purpose.

The rod 34 is biased in a downward direction by spring 35, but is retained in an upper position against the spring pressure by the engagement between the buffer cam 32 and nose 33 with the parts in the position depicted in FIGURE 6.

In this upper position of the slidable rod 34, its upper extremity 36 is adapted to project through bores 37 and 38, each formed in one of the two coupling members 39, 40, which coupling members are mounted on the upper end of truck mast 27 and are secured together by pivot pin 41 for relative pivotal movement about a vertical axis.

Each coupling member 39, 40 is formed, as shown in FIGURE 8, with a part-spherical jaw 42, 43, adapted for releasable coupling engagement with a ball 44 provided on the lower end of cable 28.

The arrangement is such that with the rod 34 in its upper position in which its upper end 36 projects within the two bores 37, 38 of the two coupling members, to retain the two bores in alignment, the jaws 42, 43 of these coupling members are held in drive transmitting engagement with the cable ball 44, while in the event of the buffer 30 hitting an obstruction, thereby causing it to swing in a rearward direction about its pivot 31 disengaging its cam 32 from nose 33, the rod 34 is at once slid downwardly by spring 35 to bring the upper end of the rod out of at least the upper bore 38 and free the associated coupling member 40. The latter is now free to turn about its pivot 41 relative to the other coupling member 39, thus permitting of the two jaws 42, 43, moving relatively apart into the disengaged position depicted in FIGURE 8, under the pressure exerted on the jaws from the driving tension in cable 28 acting through ball 44. Under these circumstances, the drive to the associated truck 25 is at once disconnected.

Re-engagement of the jaws 42, 43 with cable ball 44 and their locking in such position by rod 34 is effected manually, to facilitate which the rod is provided with lifting handle 34a.

In accordance with the present invention, the conveyor system is provided with a truck diverting device 45 consisting of a fender element 46 built-up from a number of frame members welded together, the fender element being of generally elongated form and being adapted to be disposed with its longitudinal axis vertically below the chain track 21 and parallel to but to one side of the designed predetermined path of the trucks which are required to be advanced without being brought to rest across the floor, such predetermined path of these continuously advancing trucks being depicted at 47 in FIGURE 1.

The fender element 46 embodies vertically extending tubes 48 each of which have slidably mounted therein a post 49, the lower end of each of which posts is adapted to extend slidably within a socket 50 mounted in the floor 24, the arrangement permitting of the fender element 46 being detachably secured to the floor by the engagement of the posts 49, within the socket 50, so as thereby to preclude horizontal movement of the fender element when engaged by an advancing truck.

In practice a number of pairs of sockets 50 would be provided at various positions on the floor so as to permit of different dispositions of the diverting device, to facilitate which the fender element is provided with a pair of vertically retractable ground engaging wheels 51, so that it may be wheeled to the desired position, while each post 49 is preferably screw threaded at its upper end and engages within a nut 52 with the upper end of tube 48, the post at its upper extremity carrying a turning handle 53 whereby the post can be retracted clear of the associated socket 50 when movement of the diverting device to another position is required.

The fender element 46 is provided on each of its longitudinal sides with a truck mast engaging rail 54, 55, the two rails having rearward portions 56, 57 respectively which converge towards one another at the rear end of the fender element. Herein the expressions rear and rearward have reference to the designed direction of truck advancement as denoted by the arrows in FIGURES 1 and 2.

The rails 54, 55 including their rearwardly converging portions 56, 57 are disposed at a level above the floor 24 which is somewhat below the level of the top of the truck masts 27, and the rails, including their rearwardly converging portions, are spaced horizontally outwardly from the base portions of the fender element in a rearward direction and also in a lateral or transverse direction, as shown in FIGURE 5, by a distance somewhat greater than half the overall width of each truck 25. Thus as each truck mast 27 is disposed medially of the lateral sides of the truck, the trucks can freely advance as shown in FIGURES 1 and 5 with their masts 27 in engagement with the adjacent rail 54, 55 or converging portion 56, 57 thereof without the truck platforms 26 or goods thereon or other parts of the truck, including the buffers 30, fouling the fender element.

The two rearwardly converging portions 56, 57 of the rails 54, 55 are connected together by bracket plate 58 carrying vertical spindle 59 which supports for pivotal movement about a vertical axis the forward end portion 60 of truck diverting means 61, which as illustrated, is constructed as a rearwardly extending switch or tongue embodying a pair of truck mast engaging rails 62, 63 which converge rearwardly substantially to a point at 64 (see FIGURES 3, 4 and 6).

In order to reduce wear of the truck mast where it is so adapted to engage with the fender element as well as to reduce wear of the so engaged parts of the fender element, each truck mast 27 at a height corresponding to that of the rails 54, 55, 62, 63 has mounted thereon for rotation about a vertical axis, a guide roller 27a. The provision of such guide roller facilitates the advancement of the trucks past the fender elements with their masts in engagement therewith through the said guide rollers.

The tongue 61 is displaceable about its pivot 59 between the two positions indicated in full line and in dashed line in FIGURES 1 and 6, in each of which positions one or the other of the two tongue rails 62, 63 is horizontally aligned respectively with the adjacent converging portion 56, 57 of rail 54, 55 at one or the other of the two longitudinal sides of the fender element.

The extent of pivotal displacement of the tongue 61 is such as to bring the rearwardly converging ends 64 of its two rails on one or the other lateral side of the line of advancement of the truck masts 27 which will be substantially the line of the chain 20 as diagrammatically depicted in FIGURE 1.

With the tongue 61 in the full line position depicted in FIGURES 1, 3 and 6, in which tongue rail 62 is aligned with the rearwardly converging rail portion 56, a truck advanced by chain 20 in alignment with the central longitudinal axis of fender element 46 will advance to a position in which its roller 27a on mast 27 engages with tongue rail 62, so that the mast with its associated truck is displaced into the lateral position indicated at 27' in FIGURE 1, and as the so displaced truck continues to be advanced by the conveyor chain 20, the mast 27 will through its roller 27a successively engage with the rail portion 56 and fender rail 54 with the trucks advancing at one side of the fender element, namely, that adjacent the rail 54, along the aforementioned truck path 47, such trucks so advancing to one side of the fender element being depicted in full outline in FIGURE 1. These particular trucks continue to advance without interruption past this one side of the fender element 46.

Lateral displacement of the trucks when their masts so engage the tongue 61 is ensured by constructing the front pair of the four truck wheels 65 as castor wheels, the rear pair being fixed against turning about vertical axes relative to the truck platform 26 on which the wheels 65 are mounted.

The foregoing full line position of the tongue 61 constitutes a truck advancing position.

With the tongue 61 in its other pivotal position as shown in dashed outline in FIGURES 1 and 6, namely, the truck diverting positions, its rail 63 will now be aligned with rearwardly converging fender rail portion 57 and will now be adapted to engage with the guide rollers 27a on the mast 27 of an advancing truck to divert this out of the truck path 47 with the mast through its guide roller first engaging the fender rail portion 57, and thereafter the rail 55, the trucks now advancing into the dotted and truck diverted position indicated at 25' in FIGURE 1, at which position the trucks are required to be arrested.

For this purpose at a position situated somewhat forwardly of the forward end of rail 55 a stop block 66 is mounted on the floor 24 at a height such as to engage with the buffer 30 of the foremost of the so diverted trucks and displace this buffer to disconnect the upper end of the truck mast 27 from the cable 28, in the manner already described, and thereby bring this particular truck to rest. As the next successively diverted truck advancing adjacent rail 55 approaches this already arrested truck, its buffer 30 will engage with the rear end of the platform 26 of the arrested truck; such engagement being with a bumper 67 provided on and depending from such rear platform end so as similarly to displace the buffer 30 of this succeeding truck and effect arrest thereof until eventually a line of trucks may be arrested one behind the other in the diverted position, as shown in 25' in FIGURE 1.

Insofar as each of these trucks are arrested in a position in which by the operation of the fender element 46 and its associated diverting tongue 61, the trucks are arrested at a position, namely, at 25' at one side of the aforementioned truck path 47, these arrested trucks 25' in no way interfere with the continued advancement of other trucks at the opposite side of the fender element 46 along the path 47.

The tongue 61 may be displaced manually into either of its two positions, but preferably, as shown there is provided means operable under the control of each advancing truck for displacing the tongue 61 so that each truck may predetermine itself whether it is to advance past the fender element or to be diverted into a stationary position.

For this purpose as shown in FIGURE 6, the fender element 46 between its two rearwardly converging rail portions 56, 57, carries a pair of solenoids 68, 69, the armatures 70 of which are connected by links 71 to the aforementioned forward end portion 60 of tongue 61, the links extending on opposite sides of the tongue pivot 59, and the arrangement being such that by energising one or the other of the two solenoids, the tongue 61 can be swung into one or the other of its two positions.

In association with the drive from the chain 20 to each truck, is pre-selectable means shown in FIGURE 9, comprising an attachment bracket 72 a number of which are mounted on the chain 20 at spaced intervals, each attachment bracket being connected to the upper end of cable 28 and being of forked configuration, with the two arms 73 being formed with aligned openings for the reception of selector pins 74 which are displaceable in the direction of their length in either direction from the retracted medial inoperative position shown in full line in FIGURE 9, to either extreme projected positions depicted at 74' and 74".

In either of these projected operative positions the pin ends are adapted to engage with rollers 75 on the moving members 76 of micro-switches 77, which in the known manner are arranged in banks at intervals along the length of the chain track 21, for example, where depicted in FIGURE 2.

Figure 10:
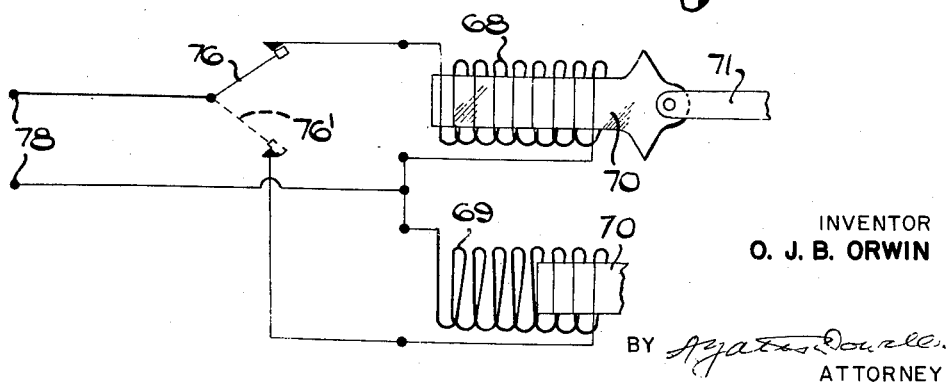

Each of these micro-switches is constructed as a two-position switch which, referring to FIGURE 10, has its moving member 76 normally in the full line position for energising from main supply terminal 78 solenoid 68, and de-energising solenoid 69, that is to say, a position in which the roller 75 of each micro-switch is not engaged by a selector pin 74.

Referring to FIGURE 6, the arrangement is such that with solenoid 68 energised, the tongue 61 is in position for continued truck advancement.

With the moving member 76 of micro-switch 77 displaced into the dotted position shown at 76' in FIGURE 10 corresponding to engagement of the associated roller 75 by a projected selector pin 74, solenoid 68 will now be de-energised and solenoid 69 energised so as now to displace the associated tongue 61 into the truck diverting position to effect arrest of the truck as already described.

Thus, diversion and arresting of any particular truck can be effected by suitably positioning the appropriate selector pin 74 connected through the drive cable 28 with the truck concerned.

In practice a number of diverting devices 45 would be provided at different positions along the length of the truck path, each controlled by one of the several microswitches 77, and the arrangement shown in FIGURE 9 is designed to take care of the case where a number of diverting devices 45 are required.

In FIGURES 11 and 12 is shown a modification of the preceding constructions, in which the diverting device 45 is disposed wholly adjacent the floor 24 to which it is secured detachably or permanently in any convenient manner, and is provided with a switch tongue 51, displaceable from a full line truck advancing position to a dashed line truck diverting position, in like manner to the preceding construction, the rear end of the tongue being supported on a floor engaging roller 79.

This tongue 61 with the side rails 54, 55 and the converging portions 56, 57 thereof, are adapted to engage either with dependent fender portions, not shown, or with guide rollers, not shown, of the trucks provided on the sides of truck platform 26 constructed so as thereby to effect diversion of these as they advance. The dependent fender portions or guide rollers provided on the truck platform in this arrangement ensure that the truck wheels 65 themselves do not engage the fender elements and these wheels 65 may all be formed as biased or self returning castor wheels, that is to say as castor wheels which are biased so as to have their planes of rotation normally parallel to the longitudinal axis, i.e. normal direction of advancement of the truck, although capable of such position when subjected to a lateral force as provided by the tongue 61 and rail portions 56 and 57 of the fender element 46.

The vertical depth of the diverting device 45 is made less than the clearance between the floor and the underside of each truck buffer 30, so as to preclude undesired disconnection of the drive to an advancing truck by engagement of the buffer 30 with the diverting device.

The tongue 61 may be displaced manually, or it may be displaced by the solenoid arrangement of the preceding construction depicted in FIGURES 6 and 10 under the control of the advancing trucks, or if desired the roller 79 may be driven from any suitable power unit such as an electric motor for traversing the tongue 61.

In FIGURES 13 and 14 is depicted a further form of diverting device of somewhat lighter construction than that shown in FIGURES 3 to 6, in which the fender element with the exception of its supporting tubes 48 is disposed in a single horizontal plane at a level corresponding to the upper portion of the truck masts, the tubes 48 being secured to the floor 24 in any convenient manner, and this fender element is provided with displaceable diverting means in the form of a tongue 61 in the manner similar to the constructions previously described.

What I claim then is:

1. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element, means for mounting the fender element in a predetermined location in relation to the floor, said fender element having operatively associated therewith means for diverting to one side of said element and to one side of said predetermined path of advancement of the trucks any one or more of a succession of advancing trucks and means for disconnecting the drive to each of the so diverted trucks to bring the same to rest at a position to one side of said truck path clear of the trucks which continue to advance successively therealong.

2. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element of elongated configuration, means for mounting the fender element in a predetermined location in relation to the floor, with the longitudinal axis thereof extending in the predetermined path of advancement of the trucks, said fender element having operatively associated therewith means for diverting to one side of said element and to one side of said path of advancement of the trucks any one or more of a succession of advancing trucks and means for disconnecting the drive to each of the so diverted trucks to bring the same to rest at a position to one side of said truck path clear of the trucks which continue to advance successively therealong.

3. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element, means for mounting the fender element in a predetermined location in relation to the floor, a switch tongue mounted for angular movement about a vertical axis relative to the fender element and at a position adjacent that end of the fender element which is rearmost in relation to the predetermined path of truck advancement, the arrangement being such that the switch tongue can be disposed in either of two positions, in one of which positions it is adapted to engage with part of an advancing truck to divert the same to one side of the fender element, and in the other of which positions the trucks are permitted to advance on the opposite side of the fender element along a path clear of the diverted trucks and means for disconnecting the drive to each of the so diverted trucks to bring the same to rest at a position to one side of said truck path clear of the trucks which continue to advance successively therealong.

4. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element, means for mounting the fender element in a predetermined location in relation to the floor, a switch tongue mounted on the fender element for angular movement about a vertical axis relative to the fender element and at a position adjacent that end of the fender element which is rearmost in relation to the truck advancement, the arrangement being such that the switch tongue can be disposed in either of two positions, in one of which positions it is adapted to engage with part of an advancing truck to divert the same to one side of the fender element, and in the other of which positions the trucks are permitted to advance on the opposite side of the fender element along a path clear of the diverted trucks and means for disconnecting the drive to each of the so diverted trucks to bring the same to rest at a position to one side of said truck path clear of the trucks which continue to advance successively therealong.

5. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element, means for mounting the fender element in a predetermined location in relation to the floor, a switch tongue mounted for angular movement about a vertical axis relative to the fender element and at a position adjacent that end of the fender element which is rearmost in relation to the predetermined path of truck advancement, the arrangement being such that the switch tongue can be disposed in either of two positions, in one of which positions it is adapted to engage with part of an advancing truck to divert the same to one side of the fender element, and in the other of which positions the trucks are permitted to advance on the opposite side of the fender element along a path clear of the diverted trucks, means for disconnecting the drive to each of the so diverted trucks to bring the same to rest at a position to one side of said truck path clear of the trucks which continue to advance successively therealong and means operable by the advancement of a truck adapted automatically to control the angular position of said switch tongue.

6. In a truck conveyor system wherein a plurality of wheeled trucks are advanced along a predetermined path over a floor by a conveyor element supported above the floor in substantially parallel relation thereto, and wherein there are means for transmitting drive from said conveyor element to said trucks, the provision of a truck diverting device, comprising a fender element, means for mounting the fender element in a predetermined location in relation to the floor, a switch tongue mounted on the fender element for angular movement about a vertical axis relative to the fender element and at a position adjacent that end of the fender element which is rearmost in relation to the predetermined path of truck advancement, the arrangement being such that the switch tongue can be disposed in either of two positions, in one of which positions it is adapted to engage with part of an advancing truck to divert the same to one side of the fender element, and in the other of which positions the trucks are permitted to advance on the opposite side of the fender element along a path clear of the diverted trucks, means for disconnecting the drive to each of the so diverted trucks to bring the same to rest at a position to one side of said truck path clear of the trucks which continue to advance successively therealong and means operable by the advancement of a truck adapted automatically to control the angular position of said switch tongue.

7. A truck conveyor system according to claim 5, wherein in association with the switch tongue is a pair of solenoids, the armatures of which are connected to the switch tongue at opposite sides of the axis of pivoting thereof, and means for energising one or the other of the two solenoids so as thereby to displace the switch tongue into one or the other of its two positions, said energising means being controlled by switch means disposed adjacent the conveyor element and adapted to be actuated by pre-selectable displaceable control means associated with the drive transmitting means operating between the conveying element and each truck, the arrangement being such that by displacing the pre-selectable displaceable control means into different positions, said switch means is actuated or is not actuated in accordance with the predetermined requirements of the conveyor system.

8. A truck conveyor system according to claim 6, wherein in association with the tongue switch is a pair of solenoids, the armatures of which are connected to the switch tongue at opposite sides of the axis of pivoting thereof, and means for energising one or the other of the two solenoids so as thereby to displace the switch tongue into one or the other of its two positions, said energising means being controlled by switch means disposed adjacent the conveyor element and adapted to be actuated by pre-selectable displaceable control means associated with the drive transmitting means operating between the conveying element and each truck, the arrangement being such that by displacing the pre-selectable displaceable control means into different positions, said switch means is actuated or is not actuated in accordance with the predetermined requirements of the conveyor system.

9. A truck conveyor system according to claim 1, wherein each truck is provided with an upstanding mast adapted to be connected to the conveying element, each fender element being provided with a rail spaced horizontally outwardly of the upper part of the fender element and adapted with its associated diverting means to engage with the truck mast, the arrangement permitting of part of the so engaged truck which projects to one side of the mast advancing beneath the fender element rail.

10. A truck conveyor system according to claim 2, wherein each truck is provided with an upstanding mast adapted to be connected to the conveying element, each fender element being provided with a rail spaced horizontally outwardly of the upper part of the fender element and adapted with its associated diverting means to engage with the truck mast, the arrangement permitting of part of the so engaged truck which projects to one side of the mast advancing beneath the fender element rail.

11. A truck conveyor system according to claim 2 wherein each truck is provided with an upstanding mast adapted to be connected to the conveying element, each fender element being provided with a rail spaced horizontally outwardly of the upper part of the fender element and adapted with its associated diverting means to engage with the truck mast, the arrangement permitting of part of the so engaged truck which projects to one side of the mast advancing beneath the fender element rail and said truck mast having rotatably mounted thereon a fender element rail engaging guide roller.

12. A truck conveyor system according to claim 1, wherein the fender element and its associated diverting means is disposed wholly immediately adjacent the floor.

13. A truck conveyor system according to claim 2, wherein the fender element and its associated diverting means is disposed wholly immediately adjacent the floor.

14. A truck conveyor system according to claim 1, wherein the drive disconnecting means comprises the provision on the forward end of each truck of a displaceable buffer connected to a disengageable coupling provided on the truck and through which the drive is transmitted from the conveying element supported above the floor, the buffer being displaceable between a projected truck driving position and a retracted position in which the coupling is disengaged to disconnect the truck drive, the arrangement being such as to permit of the first of a number of diverted trucks being arrested by a displaceable stop disposed adjacent the floor at the end of the diversion path, so as thereby to arrest the first of the diverted trucks and permit of the following diverted trucks being arrested by the buffers thereof engaging successively with the preceding already arrested truck so as thereby to be displaced and effect the said drive disconnection.

15. A truck conveyor system according to claim 2, wherein the drive disconnecting means comprises the provision on the forward end of each truck of a displaceable buffer connected to a disengageable coupling provided on the truck and through which the drive is transmitted from the conveying element supported above the floor, the buffer being displaceable between a projected truck driving position and a retracted position in which the coupling is disengaged to disconnect the truck drive, the arrangement being such as to permit of the first of a number of diverted trucks being arrested by a displaceable stop disposed adjacent the floor at the end of the diversion path, so as thereby to arrest the first of the diverted trucks and permit of the following diverted trucks being arrested by the buffers thereof engaging successively with the preceding already arrested truck so as thereby to be displaced and effect the said drive disconnection.

16. A truck conveyor system according to claim 5, wherein the drive disconnecting means comprises the provision on the forward end of each truck of a displaceable buffer connected to a disengageable coupling provided on the truck and through which the drive is transmitted from the conveying element supported above the floor, the buffer being displaceable between a projected truck driving position and a retracted position in which the coupling is disengaged to disconnect the truck drive, the arrangement being such as to permit of the first of a number of diverted trucks being arrested by a displaceable stop disposed adjacent the floor at the end of the diversion path, so as thereby to arrest the first of the diverted trucks and permit of the following diverted trucks being arrested by the buffers thereof engaging successively with the preceding already arrested truck so as thereby to be displaced and effect the said drive disconnection.

References Cited in the file of this patent

UNITED STATES PATENTS

| | | |
|---|---|---|
| 1,917,837 | Haddlesay | July 11, 1933 |
| 2,816,516 | Diehl | Dec. 17, 1957 |
| 2,871,799 | King | Feb. 3, 1959 |
| 2,982,228 | Bishop et al. | May 2, 1961 |

FOREIGN PATENTS

| | | |
|---|---|---|
| 93,494 | Austria | July 10, 1923 |